(12) United States Patent
Ono et al.

(10) Patent No.: US 7,221,415 B2
(45) Date of Patent: May 22, 2007

(54) LIQUID CRYSTAL DISPLAY APPARATUS

(75) Inventors: Shin-ichirou Ono, Kanagawa (JP); Hirokazu Fukuyoshi, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 10/420,689

(22) Filed: Apr. 23, 2003

(65) Prior Publication Data

US 2003/0202135 A1    Oct. 30, 2003

(30) Foreign Application Priority Data

Apr. 24, 2002   (JP)   .............................. 2002-121964

(51) Int. Cl.
*G02F 1/1335*    (2006.01)
(52) U.S. Cl. .......................................... 349/63; 349/61
(58) Field of Classification Search ............ 349/61–64, 349/122
See application file for complete search history.

(56) References Cited

U.S. PATENT DOCUMENTS

| | | | |
|---|---|---|---|
| 5,886,759 A * | 3/1999 | Mashino et al. ............... | 349/65 |
| 6,204,898 B1 * | 3/2001 | Maeda ......................... | 349/63 |
| 6,340,999 B1 * | 1/2002 | Masuda et al. ............... | 349/63 |
| 6,603,519 B2 | 8/2003 | Fukiharu | |
| 6,679,613 B2 | 1/2004 | Mabuchi | |
| 6,760,086 B2 * | 7/2004 | Hattori et al. ............... | 349/122 |
| 2002/0008816 A1 | 1/2002 | Yano et al. | |
| 2002/0015314 A1 | 2/2002 | Umemoto et al. | |
| 2003/0020850 A1 * | 1/2003 | Funamoto et al. ............ | 349/65 |
| 2003/0179563 A1 * | 9/2003 | Masuda ........................ | 362/26 |

FOREIGN PATENT DOCUMENTS

| | | | |
|---|---|---|---|
| EP | 1170623 A2 | | 1/2002 |
| JP | 1-123744 | * | 5/1989 |
| JP | 11-153783 A | | 6/1990 |
| JP | 7-28049 | | 1/1995 |
| JP | 2001-117097 A | | 4/2001 |
| JP | 2001-242440 | | 9/2001 |
| JP | 2002-23155 | | 1/2002 |
| JP | 2002-109935 A | | 4/2002 |

* cited by examiner

*Primary Examiner*—Dung T. Nguyen
(74) *Attorney, Agent, or Firm*—Foley & Lardner LLP

(57) ABSTRACT

A liquid crystal display apparatus of a front light type includes a liquid crystal display panel, a light guide plate, a light source optically connected with the light guide plate and irradiating light to the light guide plate, a space holding member which supports and fixes the liquid crystal panel and the light guide plate in a region outside a display area of the liquid crystal display panel to have a predetermined gap. The space holding member having a base member and an adhesive material layer on at least one side of the base member. A refractive index of the adhesive material layer is smaller than that of the light guide plate.

12 Claims, 8 Drawing Sheets

LIQUID CRYSTAL DISPLAY APPARATUS

BACKGROUND OF THE INVENTION

1. Field of the Invention

The present invention relates to a liquid crystal display apparatus, and more particularly, to a liquid crystal display apparatus of a front light type.

2. Description of the Related Art

A liquid crystal display apparatus is widely used as a monitor of office automation equipment for the reason of small size, thin shape and low power consumption. Such a liquid crystal display apparatus is composed of a liquid crystal display panel, an optical section and a housing. In the liquid crystal display panel, liquid crystal is put between opposing substrates. The orientation of liquid crystal molecules is controlled using electric field generated based on voltage applied between electrodes provided for substrates or one of the substrates. The optical section is composed of optical members such as a light source, a light guide plate, and a light spreading board. The housing supports the liquid crystal display panel and the optical section.

Also, the liquid crystal display apparatus is used as a display unit of a mobile terminal equipment such as a portable phone and a PDA for the reasons of thin shape and light weight. However, in the mobile terminal equipment, an amount of data to be handled increases for the purpose of display of Internet data. For this reason, the development for small size has been preceded, whereas expansion of a display area is demanded. To respond to such a demand, improvement has been carried out in not only the structure of the liquid crystal panel but also the assembling method of the light source and the optical members.

As methods of illuminating the liquid crystal display panel, two methods are known, i.e., a backlight method in which light is irradiated from the back side of the liquid crystal panel and a display image is viewed as the transmission light of the liquid crystal panel. The other method is a front light method in which light is irradiated from a light guide plate provided for a front portion of the liquid crystal panel and a display image is viewed as reflection light from the liquid crystal panel. In the above mobile terminal equipment, one of these two methods is mainly adopted.

In this front light method, a light source is provided along the side ends of the light guide plate. The liquid crystal display panel and the light guide plate are fixed in parallel with a predetermined gap using an adhesive material layer in order to control the direction of the light. The light from the light source is led into miniature unevenness provided for the light guide plate on the viewing side and the light reflected from the surface of the liquid crystal panel is outputted to the viewer.

With the fixation of the liquid crystal panel and the light guide plate, there are two methods: one method in which the whole surface of the liquid crystal panel is fixed with the adhesive material layer, and the other method in which the peripheral region outside the liquid crystal panel is fixed with the adhesive material layer. The former is known in Japanese Laid Open Patent Application (JP-P2002-23155A). In this conventional example, air is between the light guide plate and the liquid crystal panel and reflection increases in the boundary between the light guide plate. As a result, the reflection light overlaps an original display image on the liquid crystal display panel and occurs a white zone and the decrease of contrast. That is, the above conventional example has the purpose of prevention of the white zone and the decrease of contrast. In order to achieve the purpose by preventing the reflection at the boundary between the light guide plate and the air in the display area, an adhesive material layer is provided for the whole portion between the light guide plate and the liquid crystal display panel. Also, relation of the refractive index of the adhesive material and the refractive index of the light guide plate is restricted such that the refractive index of the light guide plate is 1.49 or more and the refractive index of the adhesive material is 1.48 or less. Thus, the light with a large incident angle is perfectly reflected at the boundary between the adhesive material layer and the light guide plate to prevent that the light with the large incident angle is incident on the display area.

In the above-mentioned method of fitting the liquid crystal display panel and the light guide plate in the whole portion, the light outputted from the light source propagates the adhesive material layer twice. Therefore, the brightness decreases because the absorption of the light by the adhesive material layer is large even if the adhesive material with a high transmittivity is used. Also, if a light quantity of the light source is increased to improve the brightness, the size and power consumption of the light source become large. Therefore, the method is not desirable for a liquid crystal display apparatus for the mobile terminal equipment.

From the above reasons, in the mobile terminal equipment, a method is used of fixing a light guide plate and a liquid crystal display panel in a peripheral area outside the display area. The liquid crystal display apparatus of this structure will be described with reference to FIGS. 1A and 1B. FIG. 1A is a cross sectional view showing the structure of the conventional liquid crystal display apparatus of a front light type in the neighborhood of the display area. FIG. 1B is an expanded view of a circled portion in FIG. 1A.

As shown in FIGS. 1A and 1B, the liquid crystal display apparatus of the front light type is composed of a liquid crystal display panel 102, a light source 4, a light guide plate 103 and a housing 101. In the liquid crystal display panel 102, liquid crystal is put between opposite substrates. The light source emits light for illuminating the liquid crystal panel 102. The light guide plate 103 guides the light emitted from the light source 104 to the side of the display area 108, reflecting the light by a small unevenness provided for a view side and leads into the liquid crystal panel 102. The housing 101 fixes them. Also, the opposing surfaces of the liquid crystal panel 102 and the light guide plate 103 are both formed to be flat. However, they are not perfectly flat. Therefore, a Newton's ring is seen in a contact section when both are fit. For this reason, a space holding member 105 such as a two sided tape which has an adhesive material layer 109 on both sides is provided for purposes of fixation of front light, the improvement of impact endurance, and holding the gap between the liquid crystal panel 102 and the light guide plate 103.

As the material of the adhesive material layer provided for one or two sides of the space holding member 105, acrylic adhesive material or silicon adhesive material is generally used, whereas the light guide plate 103 is also often formed of acrylic material. Therefore, the refractive index of the light guide plate 103 and the adhesive material 109 is substantially the same. The light incident from the light guide plate 103 goes inside the adhesive material layer 109 without being perfectly reflected in the surface of the adhesive material layer 109, and propagates to the end of the adhesive material layer 109 through dispersion, absorption, and scattering, as shown in FIGS. 1A and 1B.

The space holding member 105 such as the two sided tape is formed by cutting original tape in a predetermined size.

The adhesive material layer 109 extends from a base member 110 in the outer direction to the extent of 20 to 30 µm or more in the manufacture. When the light incident on the adhesive material layer 109 reaches the extending portion 111 of the adhesive material layer 109, the light is outputted from the extending portion 111 to illuminate like points, a line or a zone. This illumination is referred to as a bright zone in this specification.

In case of the liquid crystal display apparatus used for the monitor of the OA equipment and so on, there is not so severe limitation on the size of the equipment. Therefore, the space holding member 105 can be separated from the tip section of the display area 108 or housing 101 and can be formed in withdrawing in the back. However, in case of the equipment such as the mobile terminal equipment in which a small size and a large display screen are required, it is not possible to increase the distance (W in FIG. 1B) between the extending portion of the adhesive material layer 109 and the tip section of housing 101. When the liquid crystal display apparatus is viewed in a slant direction, the extending portion of the adhesive material layer 109 functions as the bright zone and the display quality degrades remarkably.

Also, because the refractive index of the adhesive material layer 109 is substantially the same as that of the light guide plate 103, the most of the light incident in the direction of the space holding member 105 reaches the adhesive material layer 109. Therefore, the quantity of the light transferred to the distal portion of the light guide plate 103 decreases. As the result, efficiency of use of the light decreases, and the brightness decreases and brightness uniformity is deteriorated.

Also, in the conventional structure, a two sided tape which the adhesive material layer 109 has stuck out is determined not to be good for the purpose of the bright zone. Therefore, the manufacturing yield of the two sided tape becomes low, and the cost of the liquid crystal display apparatus has risen.

SUMMARY OF THE INVENTION

Therefore, an object of the present invention is to provide a liquid crystal display apparatus of a front light method in which the generation of a bright zone can be prevented in ends of a space holding member and the brightness can be kept.

Another object of the present invention is to provide a liquid crystal display apparatus of a front light method in which brightness can be kept and brightness uniformity can be improved.

In an aspect of the present invention, a liquid crystal display apparatus of a front light type includes a liquid crystal display panel, a light guide plate, a light source optically connected with the light guide plate and irradiating light to the light guide plate, a space holding member which supports and fixes the liquid crystal panel and the light guide plate in a region outside a display area of the liquid crystal display panel to have a predetermined gap. The space holding member having a base member and an adhesive material layer on at least one side of the base member. A refractive index of the adhesive material layer is smaller than that of the light guide plate.

Here, the adhesive material layer may contain fluoric compound, and also may contain light absorptive material.

The space holding member may further include a light absorptive film provided between the light guide plate and the base member to cover the adhesive material layer at least, or a light reflective film provided between the light guide plate and the base member to cover the adhesive material layer at least.

Also, the light guide plate may have a flatflat portion with no unevenness in a region corresponding to a region of the space holding member and a region in a direction of the display area from the space holding member.

It is desirable that the space holding member is provided to substantially surround the display area.

In another aspect of the present invention, a liquid crystal display apparatus of a front light type, includes a liquid crystal display panel, a light guide plate, a light source optically connected with the light guide plate and irradiating light to the light guide plate, a space holding member which supports and fixes the liquid crystal panel and the light guide plate in a region outside a display area of the liquid crystal display panel to have a predetermined gap. The space holding member having a base member and an adhesive material layer on at least one side of the base member, and the adhesive material layer contains fluoric compound.

Here, the adhesive material layer may contain light absorptive material.

Also the space holding member may further include a light absorptive film provided between the light guide plate and the base member to cover the adhesive material layer at least, or a light reflective film provided between the light guide plate and the base member to cover the adhesive material layer at least.

Also, the light guide plate may have a flat portion with no unevenness in a region corresponding to a region of the space holding member and a region in a direction of the display area from the space holding member.

It is desirable that the space holding member is provided to substantially surround the display area.

In another aspect of the present invention, a liquid crystal display apparatus of a front light type, includes a liquid crystal display panel, a light guide plate, a light source optically connected with the light guide plate and irradiating light to the light guide plate, and a space holding member which supports and fixes the liquid crystal panel and the light guide plate in a region outside a display area of the liquid crystal display panel to have a predetermined gap. The space holding member having a base member and an adhesive material layer on at least one side of the base member, and the adhesive material layer contains light absorptive material.

Here, the space holding member may further include a light absorptive film provided between the light guide plate and the base member to cover the adhesive material layer at least, or a light reflective film provided between the light guide plate and the base member to cover the adhesive material layer at least.

Also, the light guide plate may have a flat portion with no unevenness in a region corresponding to a region of the space holding member and a region in a direction of the display area from the space holding member.

Also, it is desirable that the space holding member is provided to substantially surround the display area.

In another aspect of the present invention, a liquid crystal display apparatus of a front light type, includes a liquid crystal display panel, a light guide plate, a light source optically connected with the light guide plate and irradiating light to the light guide plate, and a space holding member which supports and fixes the liquid crystal panel and the light guide plate in a region outside a display area of the liquid crystal display panel to have a predetermined gap. The space holding member having a base member and an adhesive material layer on at least one side of the base member. The space holding member further includes a light absorptive film provided between the light guide plate and the base member to cover the adhesive material layer at least.

Here, the light guide plate may have a flat portion with no unevenness in a region corresponding to a region of the space holding member and a region in a direction of the display area from the space holding member.

Also, it is desirable that the space holding member is provided to substantially surround the display area.

In another aspect of the present invention, a liquid crystal display apparatus of a front light type, includes a liquid crystal display panel, a light guide plate, a light source optically connected with the light guide plate and irradiating light to the light guide plate, and a space holding member which supports and fixes the liquid crystal panel and the light guide plate in a region outside a display area of the liquid crystal display panel to have a predetermined gap. The space holding member having a base member and an adhesive material layer on at least one side of the base member. The space holding member further includes a light reflective film provided between the light guide plate and the base member to cover the adhesive material layer at least.

Here, the light guide plate may have a flat portion with no unevenness in a region corresponding to a region of the space holding member and a region in a direction of the display area from the space holding member.

Also, it is desirable that the space holding member is provided to substantially surround the display area.

In another aspect of the present invention, a liquid crystal display apparatus of a front light type, includes a liquid crystal display panel, a light guide plate, a light source optically connected with the light guide plate and irradiating light to the light guide plate, and a space holding member which supports and fixes the liquid crystal panel and the light guide plate in a region outside a display area of the liquid crystal display panel to have a predetermined gap. The light guide plate has a flat portion with no unevenness in a region corresponding to a region of the space holding member and a region in a direction of the display area from the space holding member.

It is desirable that the space holding member is provided to substantially surround the display area.

DESCRIPTION OF THE PREFERRED EMBODIMENTS

Hereinafter, a liquid crystal display apparatus of a front light method according to the present invention will be described in detail with reference to the attached drawings.

First Embodiment

Figure 2:
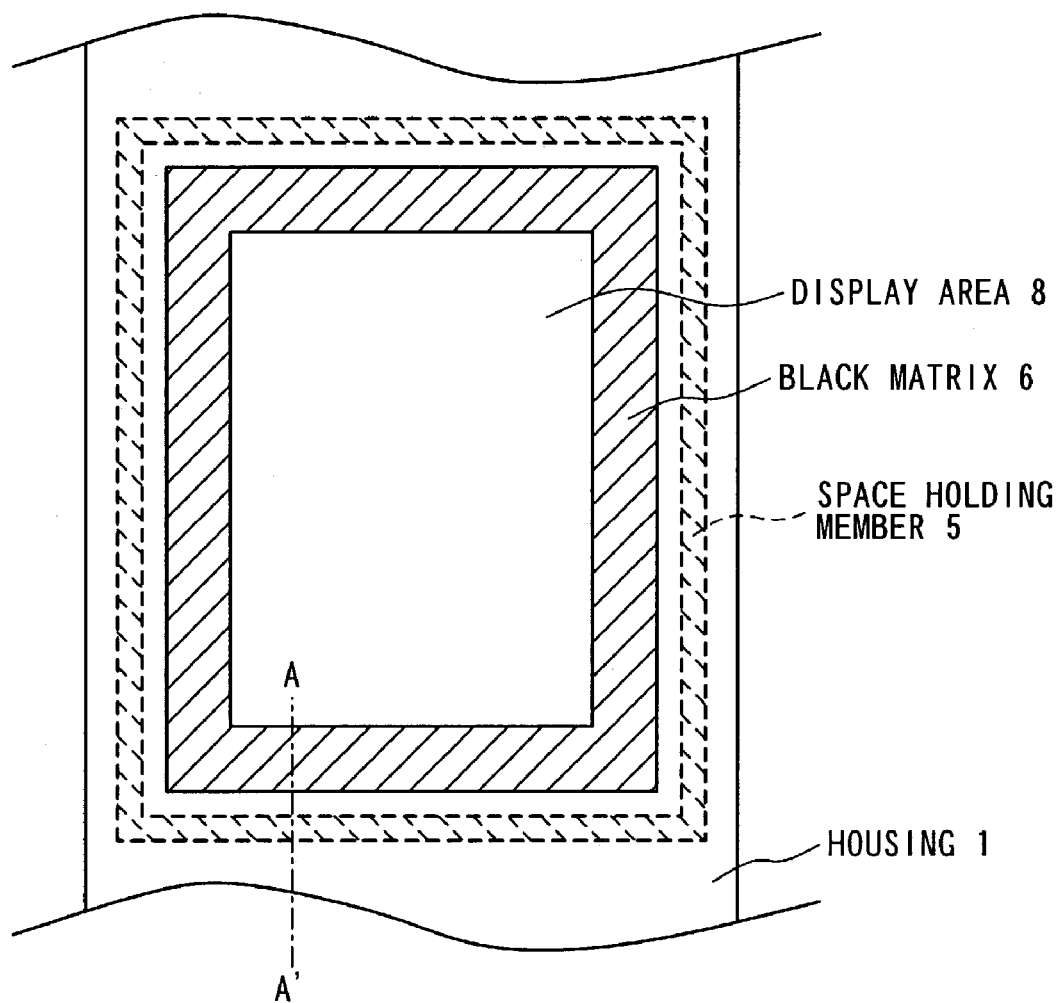
FIG. 2 is a plan view showing the structure of a liquid crystal display apparatus of a front light method according to a first embodiment of the present invention.
Figure 3A:
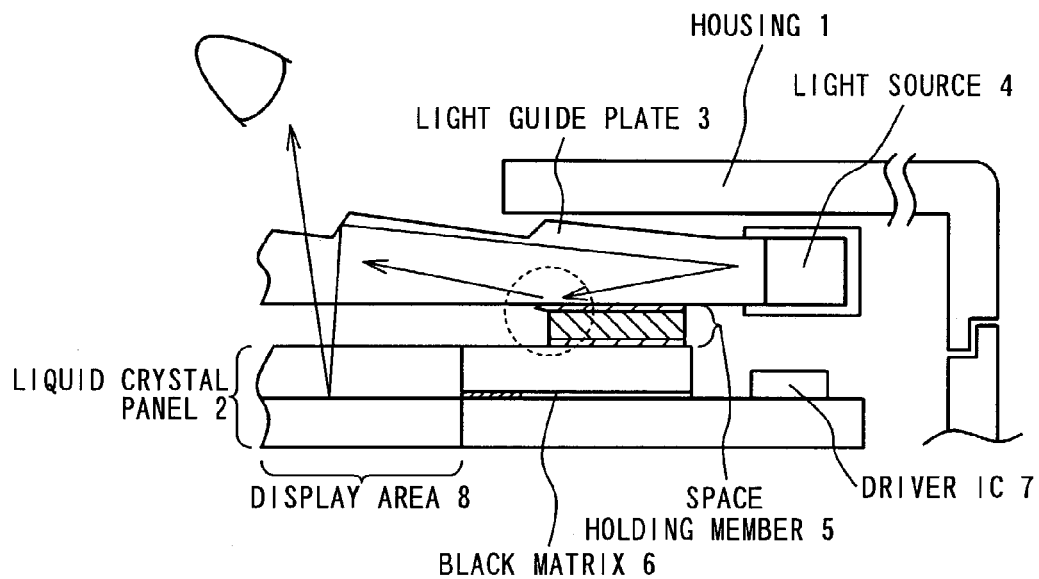
FIG. 3A is a cross sectional view showing the structure of the liquid crystal display apparatus of the front light method according to the first embodiment of the present invention along the line A—A.
Figure 3B:
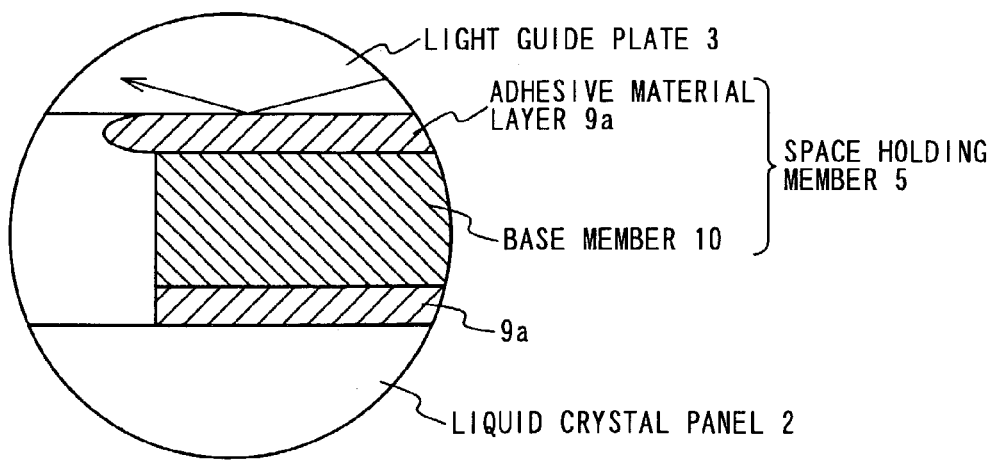
FIG. 3B is an expanded view of a circled portion in FIG. 3A.

First, the liquid crystal display apparatus of the front light method according to the first embodiment of the present invention will be described below with reference to FIG. 2 and FIGS. 3A and 3B. FIG. 2 is a plan view showing the structure of a display section of the liquid crystal display apparatus of the front light method according to the first embodiment of the present invention. Also, FIG. 3A is a cross sectional view showing a display area end of the liquid crystal display apparatus along the A—A line in FIG. 2, and FIG. 3B is an expanded view of a part of the display area end surrounded with a circle in FIG. 3A.

The liquid crystal display apparatus in the first embodiment is mainly composed of a housing 1, a liquid crystal display panel 2, a light guide plate 3, a light source 4, and a space holding member 5. In the liquid crystal display panel 2, liquid crystal is put between opposing substrates. The light source 4 provided in a side end portion to emit light. The light guide plate 3 is provided to transfer the light emitted from the light source 4 to the side of a display area 8, and to illuminate the display area 8 of the liquid crystal display panel 2 by reflecting the light with a miniature unevenness portion which is provided for the view side of the light guide plate 3. The housing 1 supports them. The space holding member 5 is provided between the liquid crystal display panel 2 and the light guide plate 3. The space holding member 5 has an adhesive material layer 9a of a low refractive index on one end or both ends of a base member 10 for the fixation of front light, for improving impact endurance, and providing a spacer between the liquid crystal display panel 2 and the light guide plate 3.

As shown in the conventional example, in the liquid crystal display apparatus of the front light method, there are two methods: one method in which the liquid crystal display panel 2 and the light guide plate 3 are fixed with the adhesive material layer in the whole of a display area, and the other method in which the liquid crystal display panel 2 and the light guide plate 3 are fixed with a space holding member 5 such as a two sided tape in a peripheral portion outside the display area 8. In the method in which the liquid crystal display panel 2 and the light guide plate 3 are fixed with the adhesive material layer in the whole display area, the brightness decreases because of the light absorption in the adhesive material layer. Therefore, the structure is used in which the adhesive material layer is not provided for the display area 8, and the space holding member 5 is provided for only the peripheral area outside the display area 8.

The space holding member 5 secures a predetermined gap between the liquid crystal display panel 2 and the light guide plate 3 to prevent generation of the Newton's ring which is caused due to non flat opposing surfaces of the liquid crystal display panel 2 and the light guide plate 3. Therefore, the space holding member 5 has a structure of the base member 10 formed of material such as PET (polyethylene terephthalate) and vinyl chloride and functioning to secure a gap, and adhesive material layers 9*a* with a low refractive index provided for one end or both end of the base member.

It should be noted that in the following description, a case that a two sided tape with the adhesive material layers on the two sides is used as the space holding member 5 will be described. However, the space holding member 5 is not limited to the two sided tape. The space holding member 5 of any type may be used if the space holding member 5 has the base member 10 for securing the gap between the liquid crystal display panel 2 and the light guide plate 3, and adhesive member layers for fixing them.

The two sided tape used as the space holding member 5 is formed from an original tape sheet of a predetermined size using a rapping method. In this case, an adhesive portion is spread to have an extending portion of about 20–30 μm from the target size depending on the pressure in the rapping and adhesion of the adhesive material layer 9*a*. Therefore, the extending portion of the adhesive material layer 9*a* is formed on the display area side of the space holding member 5 in the state in which the liquid crystal display panel 2 and the light guide plate 3 are fixed. Therefore, there is a problem that the light spreads inside the adhesive material layer 9*a*, propagates so that light emission occurs in the extending portion to generate a bright zone, when the light from the light source 4 is irradiated from the light guide plate 3 to the adhesive material layer 9*a*. It should be noted that the extending portion of the adhesive material layer 9*a* on the side of the light guide plate 3 is shown on only the side of the display area 8 in the figure to show the characteristic of the present invention conspicuously. However, there is a case that the extending portion is formed in the other portion (the outside portion and the adhesive material layer 9*a* on the side of the liquid crystal display panel 2).

Figure 1A:
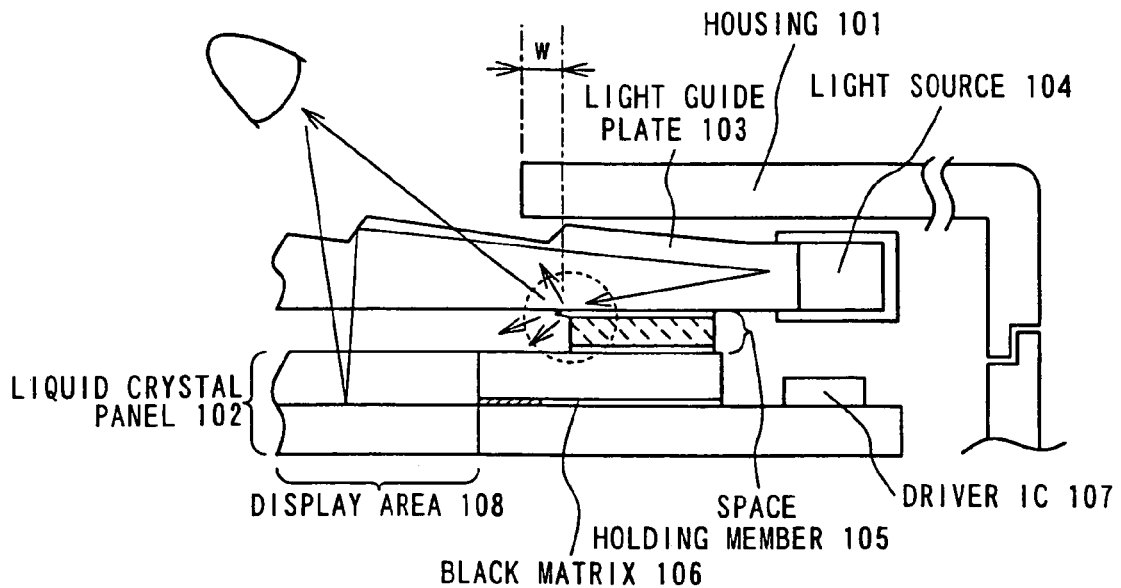
FIG. 1A is a cross sectional view showing the structure of a conventional liquid crystal display apparatus of a front light method.
Figure 1B:
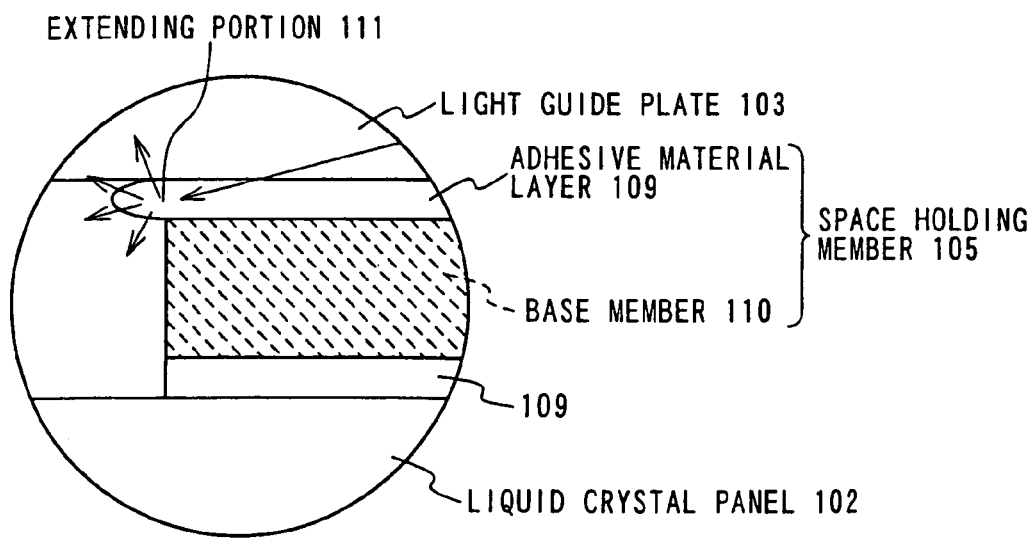
FIG. 1B is an expanded view of a circled portion in FIG. 1A.

In order to prevent the bright zone, if the width (W of FIG. 1A) between an end portion of the two sided tape on the side end of the display area 8 and an end portion of the housing 1 is made large, the bright zone can be prevented from being viewed even if the extending portion of the adhesive material layer 9*a* emits light. However, in the mobile terminal equipment such as a portable phone and a PDA, it is demanded that the size of the apparatus is made smaller whereas the display area 8 is expanded to display a large amount of data. Therefore, the width between the end portion of the two sided tape and the end portion of the housing is made narrow, and the influence of a bright zone appears in the extending portion of the adhesive material layer 9*a* conspicuously. Also, the light incident to the adhesive material layer 9*a* is not used for display. Therefore, if the extending portion of the adhesive material layer 9*a* is concealed, the usage efficiency of the light decreases and the brightness decreases.

From the above, in this embodiment, in the structure which the two sided tape is provided only for the peripheral area outside the display area 8, the refractive index of the adhesive material layer 9*a* is set to be smaller than the refractive index of the light guide plate 3 such that the light irradiated from the light guide plate 3 does not enter the adhesive material layer 9*a*, in order to prevent the generation of the bright zone without securing the width between the end of the two sided tape and the housing 1 largely.

More specifically, as the material of the light guide plate 3, acrylic material is generally used. The refractive index is about 1.5. Therefore, the adhesive material containing a fluoric compound is used for the adhesive material layer 9*a* in place of the acrylic adhesive material and the silicon adhesive material. Thus, the refractive index of the adhesive material layer 9*a* can be made lower than the refractive index of the light guide plate 3. The refractive index of the adhesive material containing the fluoric compound changes depending on concentration of the fluoric compound but is in a range of about 1.3 to 1.4 generally. Therefore, the refractive index of the adhesive material layer 9*a* is made smaller than the refractive index of the light guide plate 3, and most of the light irradiated to the surface of the adhesive material layer 9*a* is perfectly reflected and returns to the light guide plate 3. Even if there is the extending portion of the adhesive material layer 9*a*, the light entering the adhesive material layer 9*a* decreases so that the luminousness of the extending portion can be restrained. Also, the picture quality (the brightness uniformity) as the illumination apparatus can be improved. Moreover, the reflected light propagates the inside of the light guide plate 3 and contributes the illumination brightness. Therefore, the brightness improvement can be achieved.

It should be noted that the material of the adhesive material layer 9*a* of the space holding member 5 is not limited to the fluoric compound. A material with the refractive index smaller than that of the light guide plate 3 may be used as the adhesive material. Also, if the light guide plate 3 is formed of a material with a larger refractive index, the acrylic adhesive material and the silicon adhesive material can be used for the adhesive material layer 9*a*. Also, it is possible to decrease the percentage of fluoric compound.

Second Embodiment

Figure 4A:
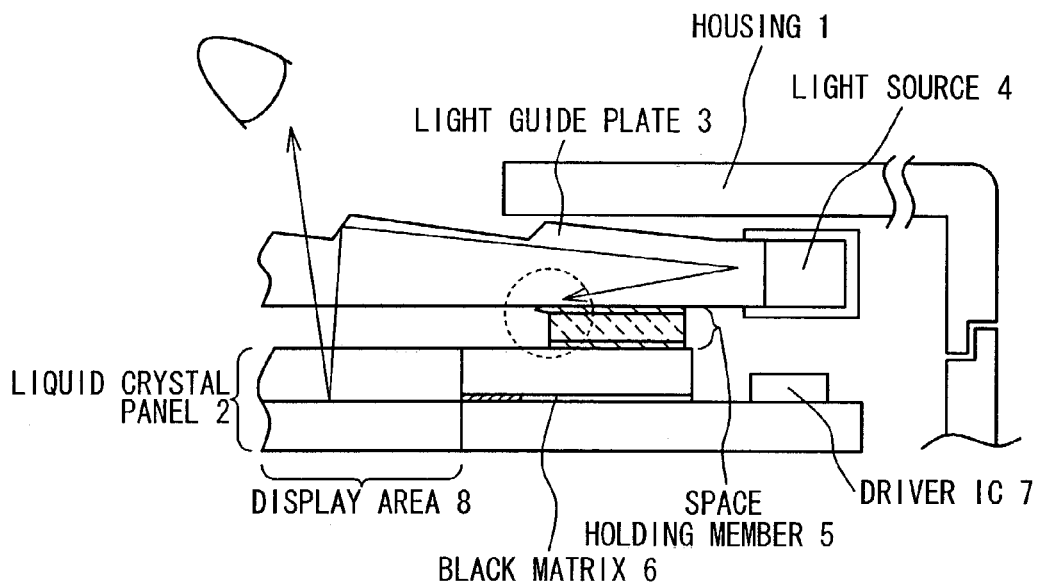
FIG. 4A is a cross sectional view showing the structure of the liquid crystal display apparatus of the front light method according to a second embodiment of the present invention.
Figure 4B:
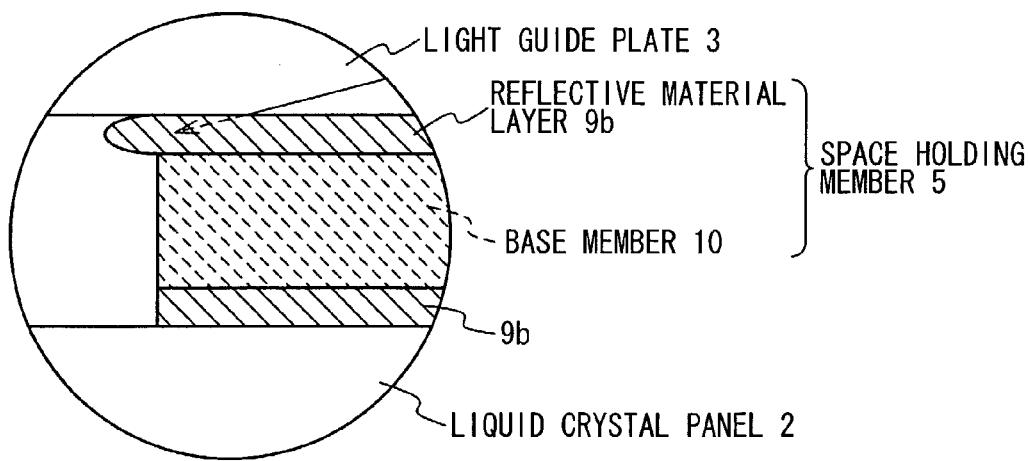
FIG. 4B is an expanded view of a circled portion in FIG. 4A.

Next, the liquid crystal display apparatus of the front light method according to the second embodiment of the present invention will be described with reference to FIGS. 4A and 4B. FIG. 4A is a cross sectional view showing the structure of the liquid crystal display apparatus of the front light method in the second embodiment in the neighborhood of the display area.

In the above first embodiment, the adhesive material layer 9*a* is selected such that the refractive index of the adhesive material layer 9*a* of the space holding member 5 is smaller than the refractive index of the light guide plate 3. Also, it is prevented that the light enters the adhesive material layer 9*a* from the light guide plate 3. However, if the light can be attenuated sufficiently before reaching the extending portion even if the light is irradiated from the light guide plate 3, the generation of the bright zone in the extending portion can be prevented.

For this purpose, in the second embodiment, an adhesive material layer 9*b* has the structure which efficiently absorbs the light entered from the light guide plate 3. As the adhesive material layer 9*b* with light absorption, the adhesive material can be used in which black light absorptive material such as carbon is distributed or mixed into a usual adhesive material such as the acrylic adhesive material or and the silicon adhesive material. Then, by using the light absorptive adhesive material layer 9b, the light entering the adhesive material layer 9b is absorbed by the light absorptive material. Thus, even when there is the extending portion of the adhesive material layer 9b, the generation of the bright zone in the extending portion can be restrained. The picture quality (the brightness uniformity) as the illumination apparatus can be improved.

It should be noted that in the above description, the black light absorptive material is distributed and mixed in the acrylic adhesive material or the silicon adhesive material. However, the black light absorptive material may be distributed and mixed in the adhesive material containing the fluoric compound shown in the first embodiment. In this case, the luminousness in the extending portion of the adhesive material layer 9b can be more restrained. Also, it is sufficient to arrange the adhesive material layer 9b with the adhesive material in which the light absorptive material is distributed or mixed on the side of the light guide plate 3 of the space holding member 5. However, the adhesive material layer 9b with the adhesive material may be provided on the side of the liquid crystal display panel 2 in order to prevent that the light transmitting the adhesive material layer 9b disperses in unintentional directions. Also, the light absorptive material may be distributed or mixed in the base member 10 of the space holding member 5, to absorb the light transmitting the adhesive material layer 9b. Also, the light absorptive material distributed or mixed in the adhesive material layer 9b is not limited to carbon. Any light absorptive material can be used which can be distributed or mixed in the adhesive material layer 9b. Also, a coloring material, pigment, and dyestuff other than the black material may be used although the light absorptive property is not so good.

It should be noted that as an example in which the black material is used, the liquid crystal display apparatus of the backlight method is disclosed in Japanese Laid Open Patent Application (JP-A-Heisei 7-28049). In this conventional example, the structure is employed in which a light spreading board is provided to attempt to achieve a high brightness of backlight. The conventional example is accomplished to solve the problems that the number of the parts increases because the light spreading board and a light shielding body are stacked, and an assembling process becomes complicated. In the conventional example, the adhesive material is used to adhere a plurality of light spreading sheets provided between the liquid crystal panel and the light guide plate in the peripheral section. The black adhesive material is used to shield the light to be incident in an un-effective display area.

On the other hand, the present invention relates to the liquid crystal display apparatus of the front light method. Use of the light absorptive adhesive material layer 9b is not to restrain a transmitted light but to restrain light emission in the extending portion by the light propagated in the inside of the adhesive material layer 9b. Therefore, the present invention is quite different from the above conventional example.

Third Embodiment

Figure 5:
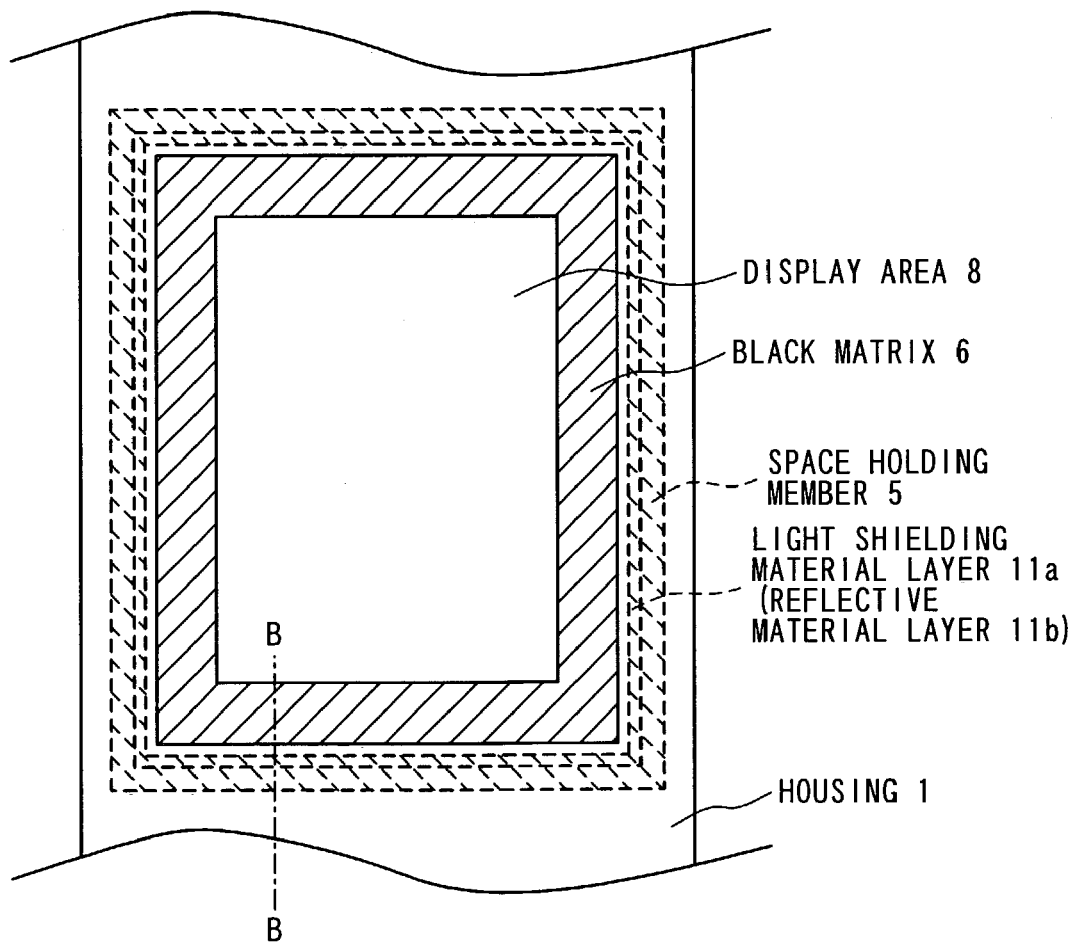
FIG. 5 is a plan view showing the structure of the liquid crystal display apparatus of the front light method according to a third embodiment of the present invention.
Figure 6A:
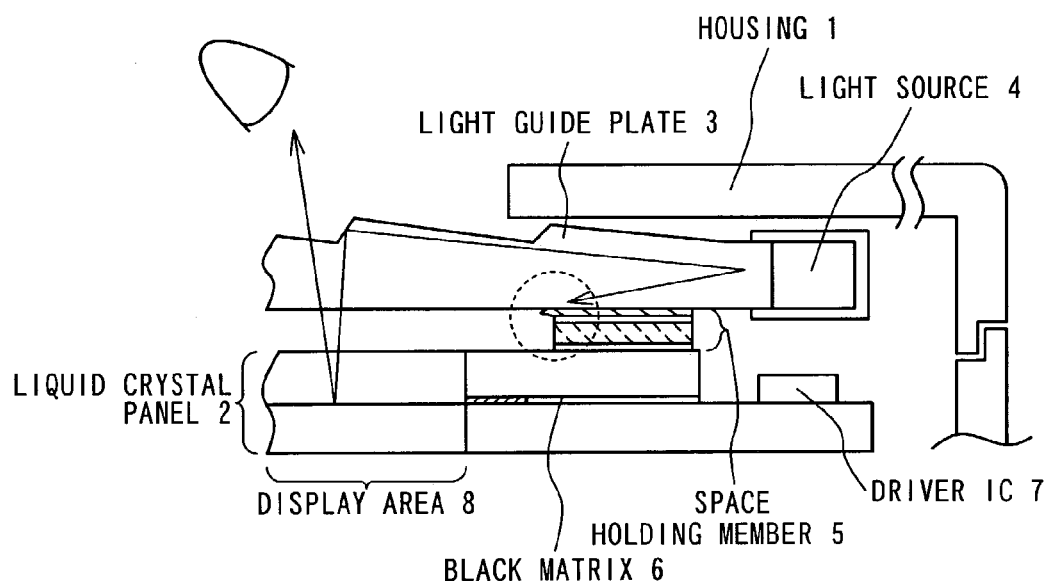
FIG. 6A is a cross sectional view showing the structure of the liquid crystal display apparatus of the front light method according to the third embodiment of the present invention along the line B—B.
Figure 6B:
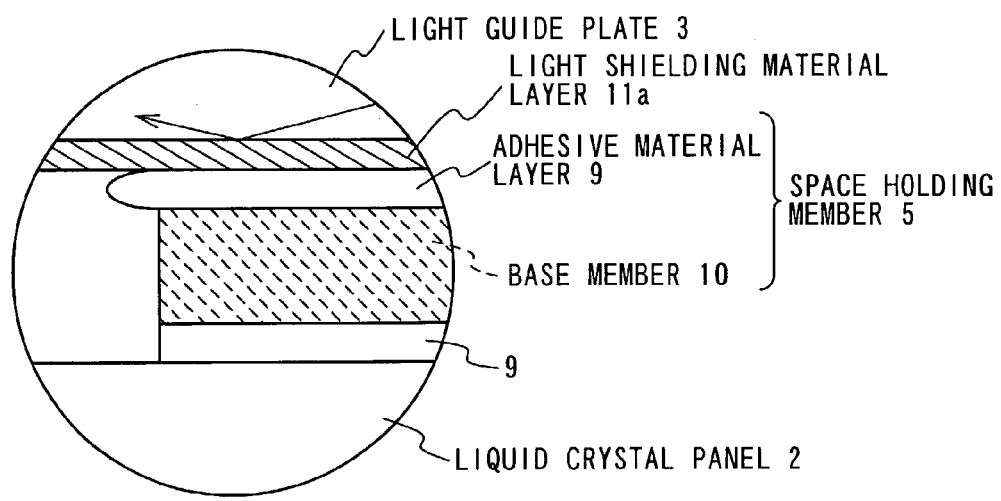
FIG. 6B is an expanded view of a circled portion in FIG. 6A.
Figure 7A:
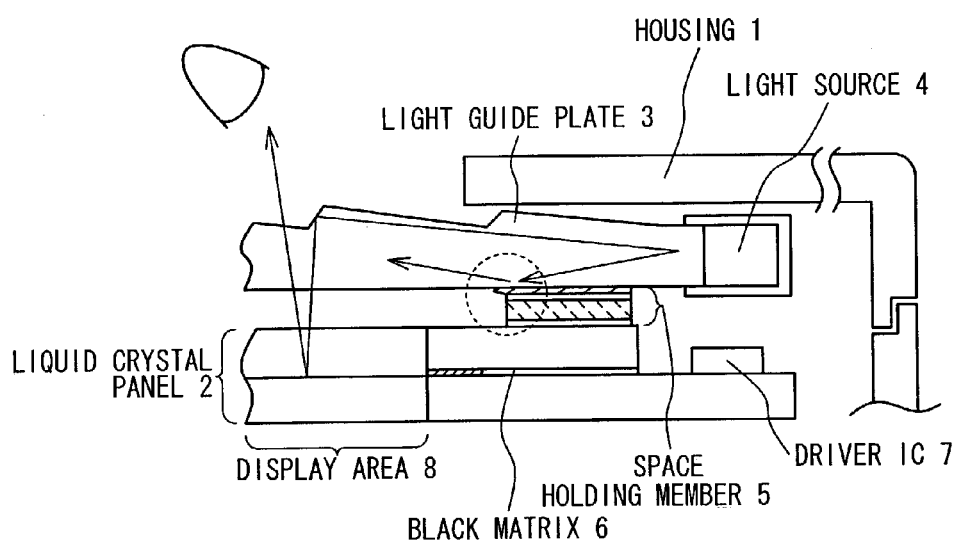
FIG. 7A is a cross sectional view showing the structure of the liquid crystal display apparatus of the front light method according to the third embodiment of the present invention.
Figure 7B:
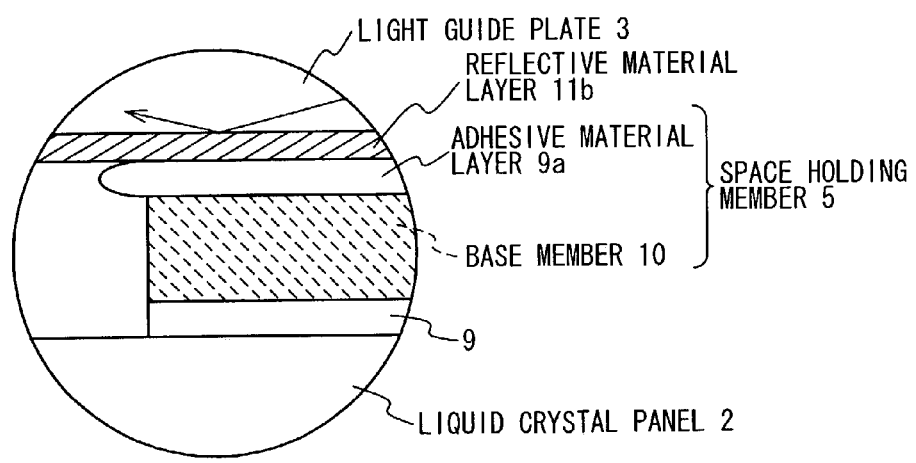
FIG. 7B is an expanded view of a circled portion in FIG. 7A.

Next, the liquid crystal display apparatus of the front light method according to the third embodiment of the present invention will be described with reference to FIGS. 5, 6*a*, 6B 7A and 7B. FIG. 5 is a plan view showing the structure of the display section of the liquid crystal display apparatus of the front light method in the third embodiment. FIGS. 6A and 7A are cross sectional views showing the neighborhood of an end portion of the display area along B—B line in FIG. 5. FIGS. 6B and 7B are expanded views of the circled portions in FIGS. 6A and 7A.

In the second embodiment, the light absorptive material is distributed and mixed in the adhesive material layer. However, a light shielding material layer may be arranged to cover the area of the light guide plate 3 corresponding to the space holding member 5 in place of the use of the light absorptive adhesive material. The light which tries to enter the adhesive material layer 9 can be absorbed by the light shielding material layer or reflected to the light guide plate 3.

More specifically, as shown in FIGS. 6A and 6B, a light absorptive material film 11*a*, e.g., a black ink in which carbon is mixed is printed or applied to cover a area of the light guide plate 3 corresponding to the space holding member 5. In such a structure, it can be prevented that the light is incident to the adhesive material layer 9 and the extending portion of the adhesive material layer 9 from the light guide plate 3. Even if there is the extending portion of the adhesive material layer 9, the luminousness of the extending portion can be prevented. Also, the picture quality (the brightness uniformity) of the illumination apparatus can be improved. Also, a reflective material film 11*b*, for example, a metal film may be formed to cover an area of the light guide plate 3 corresponding to the space holding member 5, as shown in FIGS. 7A and 7B. In such a structure, the light to be incident on the adhesive material layer 9 from the light guide plate 3 can be reflected to the light guide plate 3. Therefore, the generation of the brightness zone in the extending portion of the adhesive material layer 9 can be prevented. Also, it is possible to make the light irradiated from the light source 4 be propagated to the depth of the light guide plate 3. Thus, the usage factor of the light can be improved, like the first embodiment.

It should be noted that the light absorptive material 11*a* or the reflective material 11*b* is provided for the area of the light guide plate 3 corresponding to the space holding member 5 with respect to the normal direction of the liquid crystal display panel 2. However, it is preferable that the light absorptive material 11*a* or the reflective material 11*b* is formed wider than the extending portion of the adhesive material layer 9 in the direction of the display area 8. Also, when the light absorptive material 11*a* is used, there is a fear that the light transmitting the light absorptive material enters the adhesive material layer 9. Therefore, it is preferable that the refractive index of the adhesive material layer 9 is smaller than that of the light absorptive material 11*a*, like the first embodiment. Also, the light absorptive material is distributed and mixed in the adhesive material layer like the second embodiment.

Fourth Embodiment

Figure 8A:
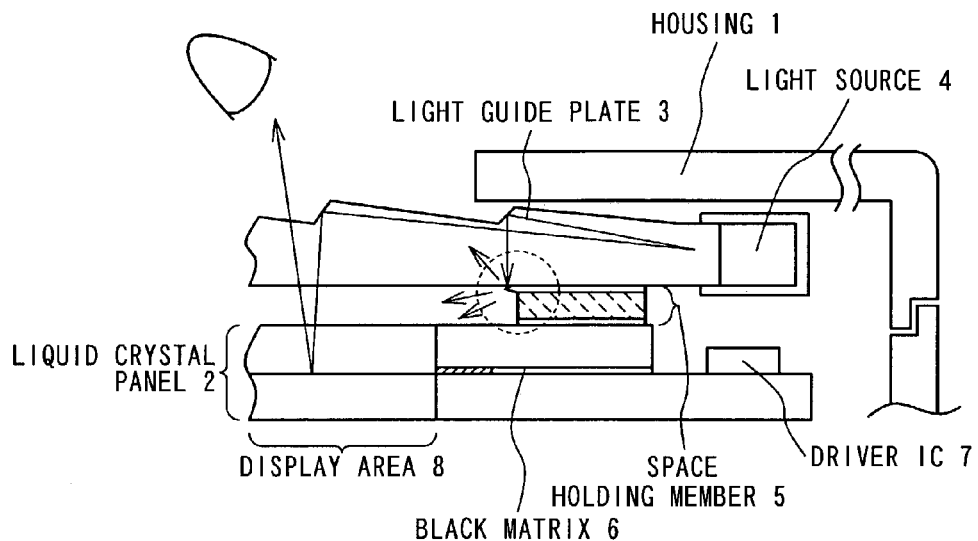
FIG. 8A is a cross sectional view showing the structure of the liquid crystal display apparatus of the front light method according to the first to third embodiments of the present invention.
Figure 8B:
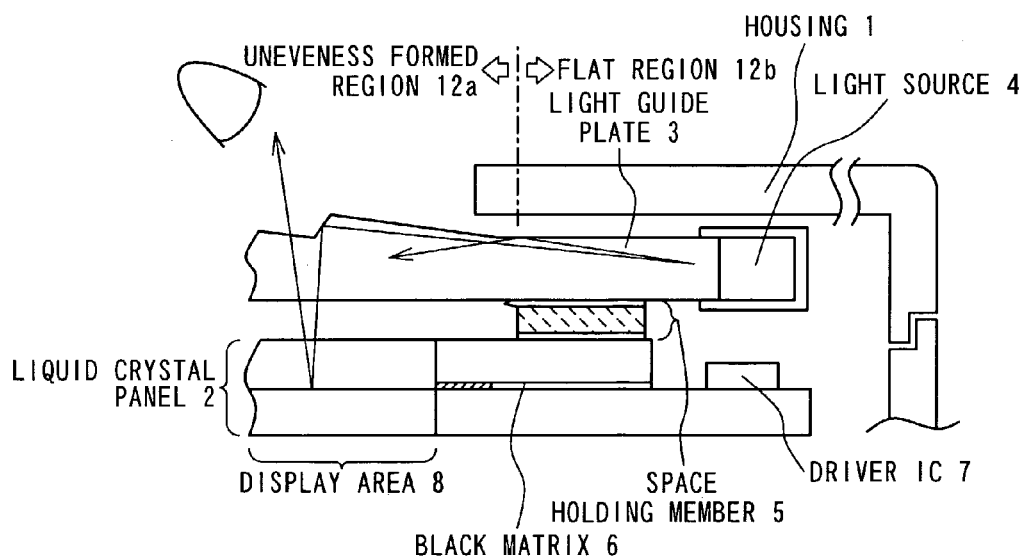
FIG. 8B is a cross sectional view showing the structure of the liquid crystal display apparatus of the front light method according to the fourth embodiment of the present invention.

Next, the liquid crystal display apparatus of the front light method according to the fourth embodiment of the present invention will be described with reference to FIGS. 8A and 8B. FIG. 8A is a cross sectional views showing the structure of a display area end of the liquid crystal display apparatus of the front light method in the first to third embodiments. FIG. 8B is a cross sectional views showing the structure of the display area end of the liquid crystal display apparatus of the front light method in the fourth embodiment.

In the first to third embodiments, the structures are used in which the adhesive material itself has characteristics in the refractive index and the containing compound or the light shielding material layer is provided between the space holding member 5 and the light guide plate 3. However, there is the light which is approximately perpendicularly reflected from the liquid crystal panel surface due to the miniature unevenness which is provided for the viewing side of the light guide plate 3, as the light which is incident on the adhesive material, in addition to the light which is incident directly from the light source 4. In the first embodiment, the light with a large incident angle, i.e., the light incident directly from the light source 4 can be perfectly reflected based on the difference in refractive index. However, the light with a small incident angle, i.e., the light approximately perpendicularly incident on the liquid crystal panel surface cannot be perfectly reflected.

On the other hand, the miniature unevenness of the light guide plate 3 is generally formed to an end region. Therefore, the light reflected in the end region of the light guide plate 3 is incident on the adhesive material layer, as shown in FIG. 8A. As a result, illumination is generated in the extending portion of the adhesive material. Therefore, in the fourth embodiment, a flat area 12b with no miniature unevenness is formed in a region of the light guide plate 3 corresponding to a region outside the adhesive material layer, in order to prevent that the light is incident on the liquid crystal panel surface perpendicularly. For this purpose, such a flat area 12b is formed by reducing the miniature unevenness on a mold when the mold is formed for injection molding, or by flattening the end area of the light guide plate 3 through a grinding process after cutting out of the light guide plate 3, or by preventing the miniature unevenness from being formed by masking an area for the flat area 12b when the acrylic resin sheet is process to form the miniature unevenness.

It should be noted that it is possible to restrain the light incident on the adhesive material layer even if the structure of the fourth embodiment is used independently. However, by combining the structure of any of the first to third embodiments and that of the fourth embodiment, it becomes possible to restrain the luminousness in the extending portion of the adhesive material layer more effectively, and to provide the liquid crystal display apparatus with high display quality. Also, the space holding member 5 and the light shielding material layer of the present invention are provided in the whole of peripheral portion to surround the display area 8 in the examples shown in FIGS. 2 and 5. However, it is not always necessary to provide them in four sides. It is sufficient to provide in a portion where the bright zone is easy to generate.

It should be noted that the present invention can be applied to the liquid crystal display apparatus of the front light method. The driving method of the liquid crystal display panel 2 may be any of methods such as the TN method, the STN method, and the IPS method. Also, as a switching element, a TFT is generally used. However, the present invention may be applied to the liquid crystal display apparatus using a different switching element. Also, the present invention is desirably applied to the mobile terminal equipment such as the portable phone and the PDA but may be applied to another type of equipment other than the above equipments.

As described above, the following effects can be achieved according to the liquid crystal display apparatus of the front light method of the present invention.

First, the adhesive material layer is not luminous even if the adhesive material has the extending portion from the base member of the space holding member such as the two sided tape. Therefore, there is no problem that the bright zone can be seen even when viewing the screen from the diagonal direction, and the good viewing result can be achieved. Thus, the picture quality (brightness uniformity) of the liquid crystal display apparatus can be improved.

Also, second, the refractive index of the adhesive material is smaller than that of the light guide plate, or the reflective material is provided in the area of the light guide plate corresponding to the space holding member, or a flat portion with no miniature unevenness is formed around the light guide plate. Therefore, the light incident in the direction of the space holding member is reflected to the light guide plate, and the incidence of the light to the direction of the space holding member is restrained. As a result, the utilization factor of the light can be improved.

Also, third, even if the adhesive material layer has the extending portion from the base member of the two sided tape, the extending portion is not luminous. Therefore, it is not necessary to handle the space holding member containing the adhesive material layer with the extending portion as a bad product in case of formation of the space holding member. Therefore, the yield of the two sided tape can be improved. Thus, the yield of the two sided tape is improved and the cost of the liquid crystal display apparatus is reduced.

What is claimed is:

1. A liquid crystal display apparatus of a front light type, comprising:
   a liquid crystal display panel;
   a light guide plate;
   a light source optically connected with said light guide plate and irradiating light to said light guide plate; and
   a space holding member which supports and fixes said liquid crystal display panel and said light guide plate in a region outside a display area of said liquid crystal display panel to have a predetermined gap;
   wherein said space holding member having a base member and an adhesive material layer on at least one side of said base member;
   wherein a refractive index of said adhesive material layer is smaller than that of said light guide plate; and
   wherein said space holding member further comprises a light absorptive film provided between said light guide plate and said base member to cover said adhesive material layer at least.

2. A liquid crystal display apparatus of a front light type, comprising:
   a liquid crystal display panel;
   a light guide plate;
   a light source optically connected with said light guide plate and irradiating light to said light guide plate; and
   a space holding member which supports and fixes said liquid crystal display panel and said light guide plate in a region outside a display area of said liquid crystal display panel to have a predetermined gap;
   wherein said space holding member having a base member and an adhesive material layer on at least one side of said base member,
   wherein a refractive index of said adhesive material layer is smaller than that of said light guide plate; and
   wherein said space holding member further comprises a light reflective film provided between said light guide plate and said base member to cover said adhesive material layer at least.

3. A liquid crystal display apparatus of a front light type, comprising:
   a liquid crystal display panel;
   a light guide plate;
   a light source optically connected with said light guide plate and irradiating light to said light guide plate;

a space holding member which supports and fixes said liquid crystal display panel and said light guide plate in a region outside a display area of said liquid crystal display panel to have a predetermined gap; and wherein said space holding member having a base member and an adhesive material layer on at least one side of said base member;

wherein said adhesive material layer contains fluoric compound; and wherein said space holding member further comprises a light absorptive film provided between said light guide plate and said base member to cover said adhesive material layer at least.

4. A liquid crystal display apparatus of a front light type, comprising:

a liquid crystal display panel;

a light guide plate;

a light source optically connected with said light guide plate and irradiating light to said light guide plate;

a space holding member which supports and fixes said liquid crystal display panel and said light guide plate in a region outside a display area of said liquid crystal display panel to have a predetermined gap; and wherein said space holding member having a base member and an adhesive material layer on at least one side of said base member;

wherein said adhesive material layer contains fluoric compound; and wherein said space holding member further comprises a light reflective film provided between said light guide plate and said base member to cover said adhesive material layer at least.

5. A liquid crystal display apparatus of a front light type, comprising:

a liquid crystal display panel;

a light guide plate;

a light source optically connected with said light guide plate and irradiating light to said light guide plate;

a space holding member which supports and fixes said liquid crystal display panel and said light guide plate in a region outside a display area of said liquid crystal display panel to have a predetermined gap;

wherein said space holding member having a base member and an adhesive material layer on at least one side of said base member;

wherein said adhesive material layer contains light absorptive material; and wherein said space holding member further comprises a light absorptive film provided between said light guide plate and said base member to cover said adhesive material layer at least.

6. A liquid crystal display apparatus of a front light type, comprising:

a liquid crystal display panel;

a light guide plate;

a light source optically connected with said light guide plate and irradiating light to said light guide plate;

a space holding member which supports and fixes said liquid crystal display panel and said light guide plate in a region outside a display area of said liquid crystal display panel to have a predetermined gap; and wherein said space holding member having a base member and an adhesive material layer on at least one side of said base member;

wherein said adhesive material layer contains light absorptive material; and wherein said space holding member further comprises a light reflective film provided between said light guide plate and said base member to cover said adhesive material layer at least.

7. A liquid crystal display apparatus of a front light type, comprising:

a liquid crystal display panel;

a light guide plate;

a light source optically connected with said light guide plate and irradiating light to said light guide plate;

a space holding member which supports and fixes said liquid crystal display panel and said light guide plate in a region outside a display area of said liquid crystal display panel to have a predetermined gap, wherein said space holding member having a base member and an adhesive material layer on at least one side of said base member, and wherein said space holding member further comprises:

a light absorptive film provided between said light guide plate and said base member to cover said adhesive material layer at least.

8. The liquid crystal display apparatus of a front light type according to claim 7, wherein said light guide plate has a flat portion with no unevenness in a region corresponding to a region of said space holding member and a region in a direction of said display area from said space holding member.

9. The liquid crystal display apparatus of a front light type according to claim 7, wherein said space holding member is provided to substantially surround said display area.

10. A liquid crystal display apparatus of a front light type, comprising:

a liquid crystal display panel;

a light guide plate;

a light source optically connected with said light guide plate and irradiating light to said light guide plate;

a space holding member which supports and fixes said liquid crystal display panel and said light guide plate in a region outside a display area of said liquid crystal display panel to have a predetermined gap, wherein said space holding member having a base member and an adhesive material layer on at least one side of said base member, and wherein said space holding member further comprises:

a light reflective film provided between said light guide plate and said base member to cover said adhesive material layer at least.

11. The liquid crystal display apparatus of a front light type according to claim 10, wherein said light guide plate has a flat portion with no unevenness in a region corresponding to a region of said space holding member and a region in a direction of said display area from said space holding member.

12. The liquid crystal display apparatus of a front light type according to claim 10, wherein said space holding member is provided to substantially surround said display area.

* * * * *